Patented Mar. 22, 1932                                   1,850,682

UNITED STATES PATENT OFFICE

HELMUTH MEIS, OF WIESDORF, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

SUBSTITUTED GUANIDINES

No Drawing. Application filed August 20, 1928, Serial No. 300,965, and in Germany January 10, 1927.

The present invention relates to a process for the production of substituted guanidines and to new compounds obtainable thereby, more particularly to a process of preparing guanidines of the probable general formula

wherein R means an aliphatic-, aromatic-, aliphatic-aromatic or hydroaromatic hydrocarbon radicle, X stands for the residue of a secondary aliphatic amine.

The process of their production consists in reacting upon a substituted thiourea of the general formula

wherein R represents an aliphatic-, aromatic-, aliphatic-aromatic or hydroaromatic hydrocarbon radicle with a secondary aliphatic amine, which latter term is intended to include heterocyclic compounds containing an NH group as part of a fully hydrogenated six membered ring, such as piperidine, hexahydroquinoline and the like. The reaction is performed in the presence of an organic or inorganic desulfurizing zinc compound and a compound of the group comprising the oxides and hydroxides of the alkalies and alkaline earth metals. Probably the mechanism of the reaction will be for instance as follows:—

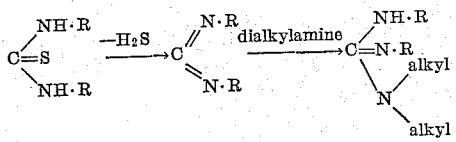

When working with piperidine a compound of the probable formula

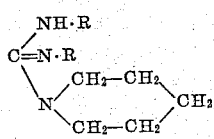

will be formed in the same manner, and similar products are obtainable when replacing the piperidine by one of its homologues, whereby it is to be understood, that ring homologues of piperidine, such as hexahydroquinoline and the like are intended to be included in the invention.

The products thus obtainable are bases forming salts with mineral acids and dithiocarbamates when treated with one mol of carbon disulfide and one mol of a secondary aliphatic amine according to the equation

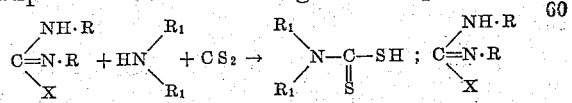

The new products are intended to be used as vulcanization-accelerators and for other purposes.

The following examples will illustrate my invention without limiting it thereto:—

*Example 1.*—100 kg. of thio-carbanilide are stirred in an autoclave with 750 litres of an aqueous dimethylamine solution of about 18% strength, about 50 kg. of zinc hydroxide and about 50 litres of 30% soda lye at a temperature of 60–70° C. for about 30 hours. When cooled the reaction mass is filtered and from the residue the diphenyl dimethylguanidine of the probable formula

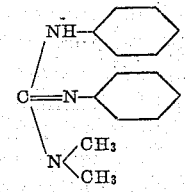

is extracted by means of a suitable organic solvent such as alcohol, benzene, toluene, diluted acetic acid etc. When working with the latter solvent the guanidine derivative may be precipitated with soda lye. It forms an oily substance and may be used in this state of purity as an accelerator in vulcanization processes. When dissolving the oily substances in alcohol or diluted acetic acid and adding nitric acid or an alkali metal nitrate, a difficultly soluble compound is precipitated, which melts at 199° C. and is probably the nitrate of the diphenyldimethylguanidine.

*Example 2.*—50 kg. of thiocarbanilide are stirred with 65 kg. of zinc sulfate, 100 liters of concentrated soda lye (about 30% strength) and 100 kg. of piperidine in 400 liters of water at a temperature of about 60° C. until no organically bound sulfur can any more be detected. Now the excess of piperidine is removed by steam distillation and the diphenylpiperidylguanidine of the probable formula

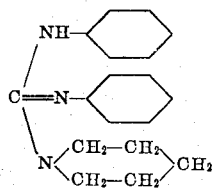

is isolated by extraction with diluted acetic acid. It forms an oily substance which on treatment with hydrochloric acid yields a solid chlorohydrate difficultly soluble in cold water.

This is a continuation in part of my co-pending application Ser. No. 214,784, filed August 22nd, 1927.

I claim:—

1. The process which comprises reacting upon a substituted thio urea of the general formula

wherein R represents an aliphatic-, aromatic-, aliphatic-aromatic or hydroaromatic hydrocarbon radicle with a secondary aliphatic amine in the presence of a desulfurizing zinc compound and a compound of the group consisting of the oxides and hydroxides of the alkalies and alkaline earth metals.

2. The process which comprises reacting upon thiocarbanilide with a secondary aliphatic amine in the presence of a desulfurizing zinc compound and a compound of the group consisting of the oxides and hydroxides of the alkalies and alkaline earth metals.

3. The process which comprises reacting upon thiocarbanilide with dimethylamine in the presence of zinc hydroxide and soda lye.

4. The new compounds of the probable formula

wherein X stands for the residue of a secondary aliphatic amine and R represents an aromatic, aliphatic-aromatic or hydroaromatic hydrocarbon radicle, said compounds being bases forming salts with mineral acids and yielding when treated with 1 mol of carbon disulfide and 1 mol of an aliphatic secondary amine the corresponding dithiocarbamates.

5. The new compounds of the probable formula

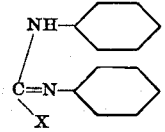

wherein X stands for the residue of a secondary aliphatic amine, said products being bases forming salts with mineral acids and yielding when treated with 1 mol of carbon disulfide and 1 mol of an aliphatic secondary amine the corresponding dithiocarbamates.

6. The asymmetrical diphenyl-dimethyl-quanidine of the probable formula

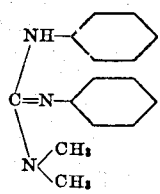

said compound being an oily substance, forming a nitrate of the melting point 199° C.

In testimony whereof I have hereunto set my hand.

HELMUTH MEIS. [L. S.]